United States Patent Office 3,153,071
Patented Oct. 13, 1964

3,153,071
ESTERS OF 2,2,4,4,6,6-HEXAMETHYL-1,3,5-CYCLOHEXANETRIOL
Ronald G. Nations and James C. Martin, Kingsport, Tenn., assignors to Eastman Kodak Company, Rochester, N.Y., a corporation of New Jersey
No Drawing. Filed June 5, 1961, Ser. No. 114,675
9 Claims. (Cl. 260—410)

This invention relates to novel cyclic esters and more particularly to monocarboxylic acid esters of 2,2,4,4,6,6-hexamethyl-1,3,5-cyclohexanetriol and to a method of preparing them.

The compounds of the invention are of the general structure:

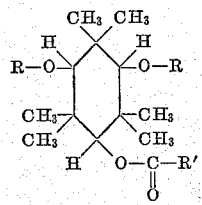

wherein R is either hydrogen or

and R' is an aliphatic or aromatic radical of from one to eight carbon atoms. Esters of the invention are useful as plasticizers for poly(vinyl chloride). A valuable property of the esters is their excellent hydrolytic stability. Accordingly, they are particularly useful as plasticizers for poly(vinyl chloride) articles that must withstand contact with water or a moist atmosphere in their normal use without excessive loss or deterioration of the plasticizer. In addition, esters of the invention are useful as lubricants and heat transfer liquids. Their excellent thermal stability is a valuable property in the latter uses.

The method of the invention by which the novel esters are formed, in general, comprises partially or totally esterifying 2,2,4,4,6,6 - hexamethyl - 1,3,5 - cyclohexanetriol with an esterifying agent such as monocarboxylic acids or their anhydrides or acid halides. The resulting product is purified, for example, by recrystallization or distillation, depending upon its physical state. The following equation illustrates the reaction:

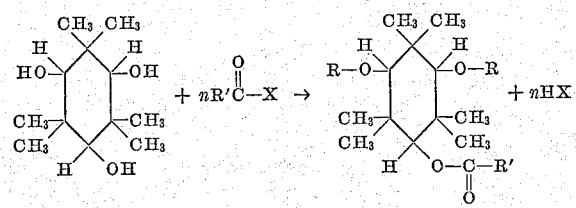

wherein $n$ is an integer from 1 to 3, R is hydrogen or

R' is an aliphatic or aryl radical having from one to eight carbon atoms, and X is halogen,

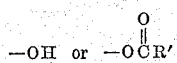

The starting material for the compounds and method of the invention, 2,2,4,4,6,6-hexamethyl-1,3,5-cyclohexanetriol, was described by Ayres and Hauser, J. Am. Chem. Soc. 64, 2461–2 (1942).

The preferred agent for esterifying 2,2,4,4,6,6-hexamethyl-1,3,5-cyclohexanetriol in the method of the invention are carboxylic acid anhydrides and halides. Other esterifying agents can be used but with less satisfactory results. For instance, the esterification of the triol with a carboxylic acid is a very slow reaction. Thus, the preferred esterifying agent is of the general structure,

wherein X is halogen (preferably chlorine) or

and R' is a $C_1$ to $C_8$ aliphatic or aryl radical. Typical esters prepared with such esterifying agents in accordance with the invention include triacetate, tripropionate, tributyrate, triisobutyrate, tris(2-ethylhexanoate), tripelargonate, monoacetate, diacetate, monobutyrate, dibutyrate, monoisobutyrate, diisobutyrate, monopelargonate, tribenzoate, tri-p-toluate and the like. Thus, the esters of the invention can be prepared from a number of different aliphatic and aromatic monocarboxylic acids having from 2 to 9 carbon atoms or from the corresponding acid halides or anhydrides. A few typical examples of such $C_2$–$C_9$ acid compounds include acetic acid, acetic anhydride, acetyl chloride, isobutyral chloride, isobutyric anhydride, 2-ethylhexanoyl chloride, nonanoyl chloride, benzoyl chloride, toluyl chlorides, phenylacetyl chloride and the like.

In the method of the invention, the reaction is conveniently carried out by forming a solution of the triol in an organic solvent, heating the solution to reflux temperature and adding the acid halide or anhydride in the desired molar proportion relative to the triol depending upon the degree of esterification desired, e.g. about 3 mols of acid per mol of triol, when the triester is desired. When an acyl chloride is used as the esterifying agent, it is preferred to employ as the reaction solvent an organic base such as pyridine which reacts with the hydrogen chloride formed in the esterification reaction.

The reaction preferably is carried out at atmospheric pressure although higher or lower pressures can be used. The reaction can be carried out at a temperature from about room temperature to the reflux temperature of the reactants. For satisfactory rate the temperature is preferably at least about 100° C. but of course below the decomposition temperature of the desired product. The reaction will proceed satisfactorily without a catalyst, especially when an acyl halide is used in the reaction. However, catalysts, for example, acid catalysts such as p-toluenesulfonic acid, benzene sulfonic acid or Lewis acids such as zinc chloride and aluminum chloride, and the like, can be used to increase reaction rate, particularly when a carboxylic acid or acid anhydride is used as the esterifying agent.

The following examples illustrate novel compounds of the invention and their method of preparation.

*Example 1*

A solution of 50 g. (0.23 mol) of 2,2,4,4,6,6-hexamethyl-1,3,5-cyclohexanetriol in 150 ml. of pyridine was refluxed. To this solution, with stirring, was slowly added 114 g. (0.7 mol) of 2-ethylhexanoyl chloride. The solution rapidly turned cloudy due to precipitation of pyridine hydrochloride. Refluxing and stirring were continued for 6 hr. After cooling, the mixture was diluted with 500 ml. of benzene and washed with two 200 ml. portions of water. The organic layer was dried over anhydrous magnesium sulfate. The benzene was removed on the steam bath and the residue was distilled in a molecular still to give 2,2,4,4,6,6 - hexamethyl - 1,3,5 - cyclohexanetriol tris(2-ethylhexanoate) (70%), B.P. 121–139° C. (10–65μ), $n_D^{20}$ 1.4697.

Analysis.—Calcd. for $C_{36}H_{66}O_6$: C, 72.7; H, 11.1. Found: C, 72.7; H, 11.1.

*Example 2*

A solution of 108 g. (0.5 mol) of 2,2,4,4,6,6-hexamethyl-1,3,5-cyclohexanetriol in pyridine was allowed to react with 273 g. (1.55 mols) of nonanoyl chloride as described in Example 1. Molecular distillation of the reaction mixture gave 258 g. (81%) of 2,2,4,4,6,6-hexamethyl - 1,3,5 - cyclohexanetriol trinonanoate, B.P. 144–168° C. (1.8–3μ), $n_D^{20}$ 1.4662.

Analysis.—Calcd. for $C_{39}H_{72}O_6$: C, 73.6; H, 11.3; mol. wt., 636. Found: C, 73.4; H, 11.4; mol. wt. (B.P. elevation in benzene), 629.

*Example 3*

A solution of 96.3 g. (0.445 mol) of 2,2,4,4,6,6-hexamethyl-1,3,5-cyclohexanetriol in 300 ml. of pyridine was refluxed. To this solution with stirring, was slowly added 150 g. (1.4 mols) of isobutyryl chloride. The mixture was refluxed and stirred for 6 hr. after the addition was complete. After cooling, the reaction mixture was diluted with 800 ml. of benzene and washed successively with water, dilute sodium hydroxide solution, and with water. After the organic layer was dried over anhydrous sodium sulfate, it was evaporated on the steam bath. The mushy residue was recrystallized from ethanol to give 132 g. (70%) of 2,2,4,4,6,6-hexamethyl - 1,3,5 - cyclohexanetriol triisobutyrate, M.P. 176–177° C.

Analysis.—Calcd. for $C_{24}H_{42}O_6$: C, 67.6; H, 9.9; mol. wt., 426. Found: C, 67.9; H, 10.0; mol. wt. (by B.P. elevation in ethanol), 415.

*Example 4*

A solution of 21.6 g. (0.1 mol) of 2,2,4,4,6,6-hexamethyl-1,3,5-cyclohexanetriol and 0.2 g. p-toluenesulfonic acid in 35.5 g. (0.35 mol) of acetic anhydride was refluxed for 4 hr. After cooling, the solution was taken up in ether and washed with sodium bicarbonate solution, then with water and finally dried over anhydrous magnesium sulfate. Evaporation of the ether yielded 33.8 g. (99%) of crude 2,2,4,4,6,6 - hexamethyl-1,3,5-cyclohexanetriol triacetate, M.P. 180–192° C. This was recrystallized from ethanol to give 30.1 g. (88%) of pure ester, M.P. 204–206° C.

Analysis.—Calcd. for $C_{18}H_{30}O_6$: C, 63.2; H, 8.8; mol. wt., 342. Found: C, 62.8; H, 8.9; mol. wt. (B.P. elevation in benzene), 334.

*Example 5*

To a refluxing mixture of 30 g. of 2,2,4,4,6,6-hexamethyl-1,3,5-cyclohexanetriol and 50 ml. of dry xylene there was slowly added dropwise 11 g. of acetyl chloride. The reaction mixture was refluxed 5 hr. after addition of the chloride. The xylene was separated by distillation. The residue was taken up in hexane, washed with water and dried over anhydrous magnesium sulfate. Evaporation of the hexane gave crude 2,2,4,4,6,6-hexamethyl-1,3,5-cyclohexanetriol monoacetate in 74% yield.

*Example 6*

A mixture of 20 g. of 2,2,4,4,6,6 - hexamethyl - 1,3,5-cyclohexanetriol and 30 g. of isobutyric anhydride was refluxed with 0.1 g. of zinc chloride for 22 hr. The isobutyric acid by-product was quantitatively recovered by distillation. Recrystallization of the cooled residue gave 2,2,4,4,6,6-hexamethyl-1,3,5 - cyclohexanetriol diisobutyrate.

Analysis.—Calcd. for $C_{20}H_{40}O_5$: mol. wt., 360. Found: mol. wt., 373.

*Example 7*

To a stirred, refluxing solution of 2,2,4,4,6,6 - hexamethyl - 1,3,5 - cyclohexanetriol (0.1 mol) in 150 ml. of pyridine was added 45 g. (0.32 mol) of benzoyl chloride over a period of 30 min. Refluxing was continued for 3 hr. Upon cooling, the reaction mixture was taken up in a large volume of ether and washed thoroughly with water. After the solution was dried with anhydrous sodium sulfate, it was evaporated to dryness on the steam bath. The residue was a crystalline mush of crude 2,2,4,4,6,6-hexamethyl-1,3,5-cyclohexanetriol tribenzoate weighing 50.6 g. (96%). This material was recrystallized from hot ethanol to give pure ester, M.P. 251–254° C.

Analysis.—Calcd. for $C_{33}H_{36}O_6$: C, 75.0; H, 6.8; mol. wt., 528. Found: C, 74.8; H, 7.1; mol. wt. (B.P. elevation in benzene), 534.

The following example illustrates the extreme resistance to hydrolysis exhibited by esters of the invention.

*Example 8*

A sample of 2,2,4,4,6,6-hexamethyl-1,3,5-cyclohexanetriol tris(2-ethylhexanoate) was refluxed in a 0.5 N solution of sodium hydroxide in 90% methanol for 21 hr. Only 6% hydrolysis was achieved under these conditions. Under the same conditions 2,2-dimethyl-1,3-propanediol, bis(2 - ethylhexanoate) was 100% hydrolyzed in 7 hr. The latter ester is normally considered to be resistant to hydrolysis. It is apparent from these data that the novel esters of hexamethylcyclohexanetriol are extremely resistant to hydrolysis.

*Example 9*

An attempt was made to saponify 2,2,4,4,6,6 - hexamethyl-1,3,5-cyclohexanetriol tribenzoate under the conditions described in Example 8. Substantially no saponification took place.

The next example shows that esters of the invention when employed as plasticizers for poly(vinyl chloride) are quite resistant to extraction by soapy water.

*Example 10*

Thirty-four parts of poly(vinyl chloride) [Geon 101E] and 66 parts of 2,2,4,4,6,6-hexamethyl-1,3,5-cyclohexanetriol tris(2-ethylhexanoate) were compounded on heated rolls. The resulting plastic was compression molded into smooth plates. The molded plates were very flexible and had the following physical properties: Rockwell Hardness: 15×93.5; Tensile Strength, p.s.i.: 2530; Elongation (100%): 250; and Modulus of Elasticity (p.s.i.×$10^5$): 2160. The loss of plasticizer from this material was negligible upon extraction with hot soapy water.

The esters of our invention are useful as heat transfer fluids. Materials that are used for this purpose need to have certain properties that will make them satisfactory for use at moderate temperatures as well as high temperatures. One property that is needed is good viscosity slope. In other words, the viscosity should not change too drastically with temperature, thus making the fluid too viscous when cold and (or) too thin when hot. The property is commonly defined as the ASTM viscosity slope. Also heat transfer fluids need to be stable to prolonged heating. In the example below, we have been able to determine the degradation of our ester by the increase in free acid present, as measured by the acid number. This is a valid test, since one of the primary thermal breakdown products of an ester is the acid from which it was derived. Another property that these fluids need to have is hydrolytic stability, since frequently the hot fluid is in contact with atmospheric and extraneous moisture. Examples 8 and 9 show that our esters have remarkable stability in this respect.

The following example illustrates the utility of our esters as heat transfer liquids.

Example 11

A reservoir, consisting of a small stainless steel beaker, was equipped with a thermometer, a thermostat and a circulating pump connected to a spiral heat exchanger made of copper tubing. This system was filled with 2,2,4,4,6,6-hexamethyl-1,3,5-cyclohexanetriol trinonanoate and maintained at 575° F. while circulating for 48 hr. The color of the liquid was unchanged and the viscosity as measured at 100° F. was also unchanged. The acid number initially was 0.09 and at the completion of the experiment it was 1.18. The ASTM viscosity slope of the starting ester was 0.70 and this was unchanged at the end of the experiment.

The invention has been described in detail with particular reference to preferred embodiments thereof, but it will be understood that variations and modifications can be effected within the spirit and scope of the invention as described hereinabove and as defined in the appended claims.

We claim:

1. A compound of the formula:

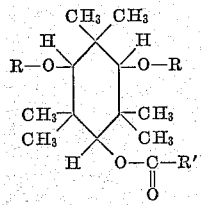

wherein R is selected from the group consisting of hydrogen and

and wherein R' is selected from the group consisting of alkyl, phenyl and alkyl-substituted phenyl of from one to eight carbon atoms.

2. A compound of the formula:

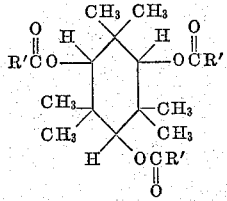

wherein R' is alkyl of from one to eight carbon atoms.

3. 2,2,4,4,6,6-hexamethyl-1,3,5-cyclohexanetriol tris(2-ethylhexanoate).
4. 2,2,4,4,6,6-hexamethyl-1,3,5-cyclohexanetriol trinonanoate.
5. 2,2,4,4,6,6-hexamethyl-1,3,5-cyclohexanetriol triisobutyrate.
6. 2,2,4,4,6,6-hexamethyl-1,3,5-cyclohexanetriol triacetate.
7. 2,2,4,4,6,6-hexamethyl-1,3,5-cyclohexanetriol monoacetate.
8. 2,2,4,4,6,6-hexamethyl-1,3,5-cyclohexanetriol diisobutyrate.
9. 2,2,4,4,6,6,-hexamethyl-1,3,5-cyclohexanetriol tribenzoate.

References Cited in the file of this patent

UNITED STATES PATENTS

| | | |
|---|---|---|
| 2,138,809 | Reiff et al. | Nov. 29, 1938 |
| 2,584,884 | Whetstone et al. | Feb. 12, 1952 |

OTHER REFERENCES

Senderens et al.: Compt. rend., 174, 616–8 (1922).
Ayres et al.: J. Am. Chem. Soc., 64, 2461–2 (1942).
Fieser et al.: Organic Chemistry (Boston, 1958), p. 296.
Hodgson et al.: Chem. Abstracts, vol. 54, p. 25061b, 1960. GD1 A51.